(12) United States Patent
Kuang et al.

(10) Patent No.: US 12,309,703 B2
(45) Date of Patent: May 20, 2025

(54) SIGNAL MONITORING SKIPPING METHOD AND APPARATUS

(71) Applicant: Huawei Technologies Co., Ltd., Shenzhen (CN)

(72) Inventors: Yiru Kuang, Beijing (CN); Baokun Shan, Shenzhen (CN); Haibo Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 446 days.

(21) Appl. No.: 17/763,968

(22) PCT Filed: Jun. 19, 2020

(86) PCT No.: PCT/CN2020/097151
§ 371 (c)(1),
(2) Date: Mar. 25, 2022

(87) PCT Pub. No.: WO2021/057122
PCT Pub. Date: Apr. 1, 2021

(65) Prior Publication Data
US 2022/0353818 A1 Nov. 3, 2022

(30) Foreign Application Priority Data
Sep. 29, 2019 (CN) .......................... 201910933384.5

(51) Int. Cl.
*H04W 52/02* (2009.01)
*H04W 72/23* (2023.01)
(Continued)

(52) U.S. Cl.
CPC ... *H04W 52/0235* (2013.01); *H04W 52/0232* (2013.01); *H04W 72/23* (2023.01); *H04W 76/28* (2018.02); *H04W 80/02* (2013.01)

(58) Field of Classification Search
CPC ............. H04W 76/28; H04W 52/0216; H04W 52/0235; H04W 52/0232; H04W 72/23;
(Continued)

(56) References Cited

U.S. PATENT DOCUMENTS

2020/0389874 A1* 12/2020 Lin ........................ H04W 72/23
2021/0007050 A1* 1/2021 Lin ........................ H04W 72/23
(Continued)

FOREIGN PATENT DOCUMENTS

CN 109257823 A 1/2019
CN 109863780 A 6/2019
(Continued)

OTHER PUBLICATIONS

"Report on [105bis#27][NR/Power Saving] PDCCH skipping," Source: CATT, Agenda Item: 11.11.4.2, Document for: Discussion and Decision, 3GPP TSG-RAN WG2 Meeting #106, R2-1905665, Reno, Nevada, USA, May 13-17, 2019, 24 pages.
(Continued)

*Primary Examiner* — Allahyar Kasraian
(74) *Attorney, Agent, or Firm* — Slater Matsil, LLP

(57) ABSTRACT

A signal monitoring method is provided: If the terminal device determines, based on a message received or sent in a first time unit, that the terminal device is not in a DRX active time in a second time unit, the terminal device monitors the power saving signal in the second time unit. The terminal device determines, based on the power saving signal, whether to monitor a PDCCH in a first time interval. The first time unit is located before the second time unit, and is separated from the second time unit by M third time units. M is an integer greater than or equal to 1. The embodiments of this application are applied to a mobile communications system such as 5G NR.

17 Claims, 4 Drawing Sheets

(51) Int. Cl.
*H04W 76/28* (2018.01)
*H04W 80/02* (2009.01)

(58) Field of Classification Search
CPC . H04W 80/02; H04W 52/325; H04W 52/143; H04W 28/0221
See application file for complete search history.

(56) References Cited

U.S. PATENT DOCUMENTS

| | | | |
|---|---|---|---|
| 2021/0051584 A1* | 2/2021 | Cheng | H04W 74/0833 |
| 2021/0314864 A1 | 10/2021 | Xue et al. | |
| 2022/0078715 A1 | 3/2022 | Li | |

FOREIGN PATENT DOCUMENTS

| | | |
|---|---|---|
| CN | 114745766 B | 11/2023 |
| WO | 2019063336 A1 | 4/2019 |

OTHER PUBLICATIONS

"Discussion on the Impact of WUS to the C-DRX," Agenda Item: 11.11.4.1, Source: Huawei, HiSilicon, Document for: Discussion and decision, 3GPP TSG-RAN2 Meeting#106, R2-1906903, Reno, USA, May 13-17, 2019, 5 pages.

"3rd Generation Partnership Project; Technical Specification Group Radio Access Network; NR; Physical layer procedures for control (Release 15)," 3GPP TS 38.213 V15.7.0, Sep. 2019, 108 pages.

"3rd Generation Partnership Project; Technical Specification Group Radio Access Network; NR; Physical layer procedures for data (Release 15)," 3GPP TS 38.214 V15.7.0, Sep. 2019, 106 pages.

"3rd Generation Partnership Project; Technical Specification Group Radio Access Network; NR; Medium Access Control (MAC) protocol specification (Release 15)," 3GPP TS 38.321 V15.7.0, Sep. 2019, 78 pages.

"3rd Generation Partnership Project; Technical Specification Group Radio Access Network; NR; Radio Resource Control (RRC) protocol specification (Release 15)," 3GPP TS 38.331 V15.7.0, Sep. 2019, 527 pages.

"Power Saving Signal/Channel/Procedure for Triggering Adaptation," Agenda Item: 7.2.9.2.2, Source: Huawei, HiSilicon, Document for: Discussion and Decision, 3GPP TSG RAN WG1 Ad-Hoc Meeting 1901, R1-1900041, Taipei, Jan. 21-25, 2019, 7 pages.

"Consideration on Power Saving Signal," Agenda Item: 11.11.4.1, Source: ZTE, Sanechips, Document for: Discussion and Decision, 3GPP TSG-RAN Meeting #105 bis, R2-1903396, Xi'an, China, Apr. 8-12, 2019, 5 pages.

"Further Discussion on UE Behavior upon Reception of WUS," Agenda item: 11.11.4.1, Source: Qualcomm Inc., Document for: Discussion and Decision, 3GPP TSG-RAN WG2 Meeting #106, R2-1906703, Reno, USA, May 13-17, 2019, 4 pages.

Asia Pacific Telecom co. Ltd, "UE behavior on WUS occasion in DRX Active Time" [online], 3GPP TSG RAN WG2. #107 R2-1911618, Internet URL:https://www.3gpp.org/ftp/tsg_ran/WG2_RL2/TSGR2_107/Docs/R2-1911618.zip>, Aug. 26-30, 2019, 5 pages.

* cited by examiner

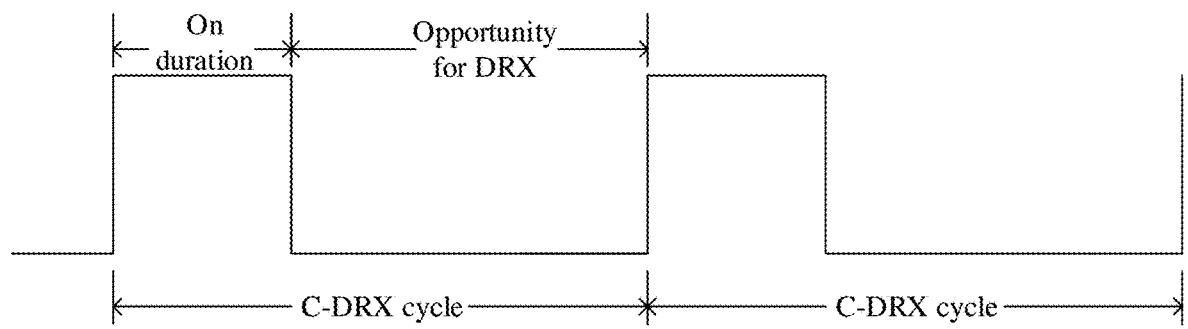
FIG. 1 - PRIOR ART
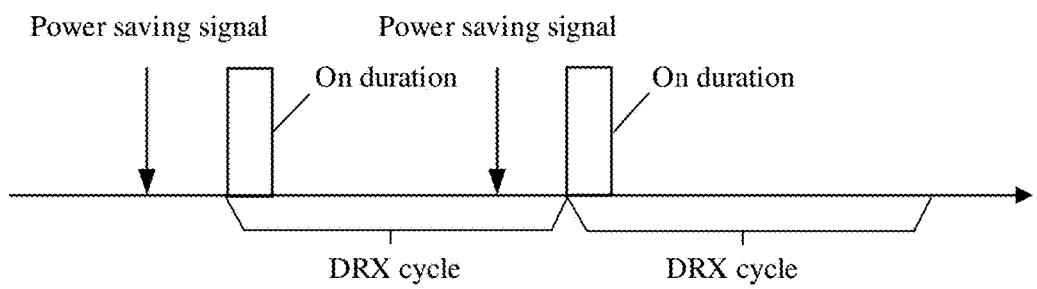
FIG. 2 - PRIOR ART
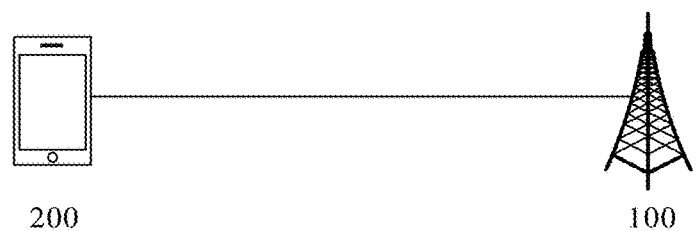
FIG. 3

SIGNAL MONITORING SKIPPING METHOD AND APPARATUS

CROSS-REFERENCE TO RELATED APPLICATIONS

This application is a National Stage of International Application No. PCT/CN2020/097151, filed on Jun. 19, 2020, which claims priority to Chinese Patent Application No. 201910933384.5, filed on Sep. 29, 2019, both of which are hereby incorporated by reference in their entireties.

TECHNICAL FIELD

This application relates to the communications field, and in particular, to a signal monitoring method and an apparatus.

BACKGROUND

In long term evolution (LTE) and 5th generation (5G) mobile communications system new radio (NR), a discontinuous reception cycle (DRX cycle) is defined. As shown in FIG. 1, the DRX cycle includes "On Duration" and an "Opportunity for DRX". At an On Duration start moment (or a DRX Cycle start moment), a DRX on duration timer (drx-onDurationTimer, which may also be referred to as onDurationTimer) may be started. Duration of the drx-onDurationTimer is duration of the On Duration. In running duration of the drx-onDurationTimer, a terminal device may be in a wake-up state. In other words, the terminal device monitors a physical downlink control channel (PDCCH). Expiration of the drx-onDurationTimer indicates that an "on Duration" time period ends. In this case, the terminal device may enter "Opportunity for DRX" time. During the "Opportunity for DRX", the terminal device is in a sleep time (a sleep state) and does not receive the PDCCH, to reduce power consumption. However, if the terminal device receives, in the running duration of the drx-onDuration-Timer, a PDCCH for scheduling new transmission, because the terminal device is likely to continue to be scheduled by a base station subsequently, the terminal device may start (or restart) an inactivity timer (drx-InactivityTimer). The terminal device may continue to monitor the PDCCH in running duration of the drx-InactivityTimer until the drx-Inactivity-Timer expires. Generally, in the running duration of the drx-onDurationTimer and/or the drx-InactivityTimer, it may be considered that the terminal device is in an active time. In other words, the terminal device needs to monitor the PDCCH.

To further save power consumption, in standardization discussion of NR release 16 (Rel-16), a method based on a power saving signal is proposed. As shown in FIG. 2, before the DRX cycle starts (in other words, before the OnDuration), a network device may send the power saving signal to the terminal device, to instruct the terminal device to enter the sleep state in one or more DRX cycles. Certainly, the terminal device in the sleep state may alternatively be woken up through the power saving signal.

Generally, time (an occasion) for monitoring the power saving signal is before the On Duration. However, if the terminal device is still in the active time, for example, the drx-InactivityTimer is still running. In this case, the terminal device may not need to monitor (listen to) the power saving signal, to reduce the power consumption. Therefore, how to determine whether the terminal device is in the active time, so as to determine whether the power saving signal needs to be monitored becomes an urgent problem to be resolved.

SUMMARY

Embodiments of this application provide a signal monitoring method and an apparatus, to determine whether a terminal device is in an active time, so as to determine whether a power saving signal needs to be monitored.

According to a first aspect, an embodiment of this application provides a signal monitoring method, including: If a terminal device determines, based on a message received or sent in a first time unit, that the terminal device is not in a DRX active time in a second time unit, the terminal device monitors a power saving signal in the second time unit. The terminal device determines, based on the power saving signal, whether to monitor a PDCCH in a first time interval. The first time unit is located before the second time unit, and is separated from the second time unit by M third time units. M is an integer greater than or equal to 1.

According to the method provided in this embodiment of this application, the terminal device may determine, based on the message received or sent in the first time unit, whether the terminal device is in the active time in the second time unit (an occasion for monitoring the power saving signal). If it is determined that the terminal device is not in the DRX active time in the second time unit, the terminal device needs to monitor the power saving signal in the second time unit. This resolves a problem in the prior art.

In a possible implementation of the first aspect, that a terminal device determines, based on a message received or sent in a first time unit, that the terminal device is not in a DRX active time in a second time unit specifically includes: If a first condition is met, the terminal device is not in the DRX active time in the second time unit. The first condition includes at least one of the following: The terminal device receives a DRX-related media access control control element (MAC CE) in the first time unit. Alternatively, the terminal device does not receive an uplink grant or a downlink assignment in the first time unit. Alternatively, the terminal device does not send a scheduling request (SR) in the first time unit.

Based on the foregoing condition, the terminal device may accurately determine whether the terminal device is in the DRX active time in the second time unit. This eliminates a fuzzy period of short-time alignment between a network device side and a terminal device side, so that the terminal device may accurately determine whether the power saving signal needs to be monitored in the second time unit.

According to a second aspect, an embodiment of this application provides a signal monitoring method, including: If a terminal device determines, based on a message received or sent in a first time unit, that the terminal device is in a DRX active time in a second time unit, the terminal device does not monitor a power saving signal in the second time unit. The power saving signal is used to indicate the terminal device whether to monitor a PDCCH in a first time interval. The first time unit is located before the second time unit, and is separated from the second time unit by M third time units. M is an integer greater than or equal to 1.

According to the method provided in this embodiment of this application, the terminal device may determine, based on the message received or sent in the first time unit, whether the terminal device is in the active time in the second time unit (an occasion for monitoring the power saving signal). If it is determined that the terminal device is in the DRX active time in the second time unit, the terminal device does not need to monitor the power saving signal in the second time unit. This may reduce power consumption of the terminal device.

In a possible implementation of the second aspect, that a terminal device determines, based on a message received or sent in a first time unit, that the terminal device is in a DRX active time in a second time unit specifically includes: If a second condition is met, the terminal device is in the DRX active time in the second time unit. The second condition includes at least one of the following: The terminal device does not receive a DRX-related MAC CE in the first time unit. Alternatively, the terminal device receives an uplink grant or a downlink assignment in the first time unit. Alternatively, the terminal device sends an SR in the first time unit.

Based on the foregoing condition, the terminal device may accurately determine whether the terminal device is in the DRX active time in the second time unit. This eliminates a fuzzy period of short-time alignment between a network device side and a terminal device side, so that the terminal device may accurately determine whether the power saving signal needs to be monitored in the second time unit.

In a possible implementation of the second aspect, the method further includes: The terminal device starts a duration timer corresponding to a DRX cycle following a DRX cycle in which the second time unit is located.

In a possible implementation of the first aspect or the second aspect, the second time unit is one of N (discrete) time units, configured by a network device, that are used to monitor the power saving signal. N is an integer greater than or equal to 1. Alternatively, the second time unit is a time unit that is in a (continuous) time interval and that is configured by the network device to monitor the power saving signal.

In a possible implementation of the first aspect or the second aspect, the third time unit is in a unit of millisecond, and M is any integer from 1 to 7.

According to a third aspect, an embodiment of this application provides a signal transmission method, including: A network device sends or receives a message in a first time unit. The message sent by the network device includes at least one of a DRX-related MAC CE, an uplink grant, or a downlink assignment. The message received by the network device includes an SR.

According to a fourth aspect, an embodiment of this application provides a terminal device, including a processing unit, configured to: if it is determined, based on a message received or sent by a transceiver unit in a first time unit, that the terminal device is not in a DRX active time in a second time unit, monitor a power saving signal in the second time unit. The processing unit is further configured to determine, based on the power saving signal, whether to monitor a PDCCH in a first time interval. The first time unit is located before the second time unit, and is separated from the second time unit by M third time units. M is an integer greater than or equal to 1.

In a possible implementation of the fourth aspect, the processing unit is configured to: if a first condition is met, determine that the terminal device is not in the DRX active time in the second time unit. The first condition includes at least one of the following: A DRX-related MAC CE is received through the transceiver unit in the first time unit. Alternatively, no uplink grant or downlink assignment is received through the transceiver unit in the first time unit. Alternatively, an SR is not sent through the transceiver unit in the first time unit.

According to a fifth aspect, an embodiment of this application provides a terminal device, including a processing unit, configured to: if it is determined, based on a message received or sent by a transceiver unit in a first time unit, that the terminal device is in a DRX active time in a second time unit, avoid monitoring a power saving signal in the second time unit. The power saving signal is used to indicate the terminal device whether to monitor a PDCCH in a first time interval. The first time unit is located before the second time unit, and is separated from the second time unit by M third time units. M is an integer greater than or equal to 1.

In a possible implementation of the fifth aspect, the processing unit is configured to: if a second condition is met, determine that the terminal device is in the DRX active time in the second time unit. The second condition includes at least one of the following: A DRX-related MAC CE is not received through the transceiver unit in the first time unit. Alternatively, an uplink grant or a downlink assignment is received through the transceiver unit in the first time unit. Alternatively, an SR is sent through the transceiver unit in the first time unit.

In a possible implementation of the fifth aspect, the processing unit is further configured to start a duration timer corresponding to a DRX cycle following a DRX cycle in which the second time unit is located.

In a possible implementation of the fourth aspect or the fifth aspect, the second time unit is one of N time units, configured by a network device, that are used to monitor the power saving signal. N is an integer greater than or equal to 1. Alternatively, the second time unit is a time unit that is in a time interval and that is configured by the network device to monitor the power saving signal.

In a possible implementation of the fourth aspect or the fifth aspect, the third time unit is in a unit of millisecond, and M is any integer from 1 to 7.

According to a sixth aspect, an embodiment of this application provides a network device, including a transceiver unit, configured to send a message or receive a message in a first time unit. The sent message includes at least one of a DRX-related MAC CE, an uplink grant, or a downlink assignment. The received message includes an SR.

According to a seventh aspect, an embodiment of this application provides a computer-readable storage medium, including an instruction. When the instruction is run on a computer, the computer is enabled to perform any method provided in any one of the foregoing aspects.

According to an eighth aspect, an embodiment of this application provides a computer program product including an instruction. When the computer program product runs on a computer, the computer is enabled to perform any method provided in any one of the foregoing aspects.

According to a ninth aspect, an embodiment of this application provides a chip system. The chip system includes a processor, and may further include a memory. The chip system is configured to implement any method provided in any one of the foregoing aspects. The chip system may include a chip, or may include a chip and another discrete device.

According to a tenth aspect, an embodiment of this application further provides a communications apparatus. The apparatus may be a terminal device, a network device, or a chip. The apparatus includes a processor, configured to implement any method provided in any one of the foregoing aspects. The communications apparatus may further include a memory, configured to store a program instruction and data. The memory may be a memory integrated into the apparatus, or an off-chip memory disposed outside the apparatus. The memory is coupled to the processor. The processor may invoke and execute the program instruction stored in the memory, to implement any method provided in any one of the foregoing aspects. The communications apparatus may further include a communications interface. The communications interface is used by the apparatus to communicate with another device.

According to an eleventh aspect, an embodiment of this application provides a system. The system includes the terminal device in the fourth aspect or the fifth aspect and the network device in the sixth aspect.

BRIEF DESCRIPTION OF THE DRAWINGS

FIG. 1 is a schematic diagram of a DRX cycle in the prior art;

FIG. 2 is a schematic diagram of sending a power saving signal in the prior art;

FIG. 3 is a schematic diagram of an architecture of a method applicable to signal monitoring according to an embodiment of this application;

DETAILED DESCRIPTION OF ILLUSTRATIVE EMBODIMENTS

Figure 4:
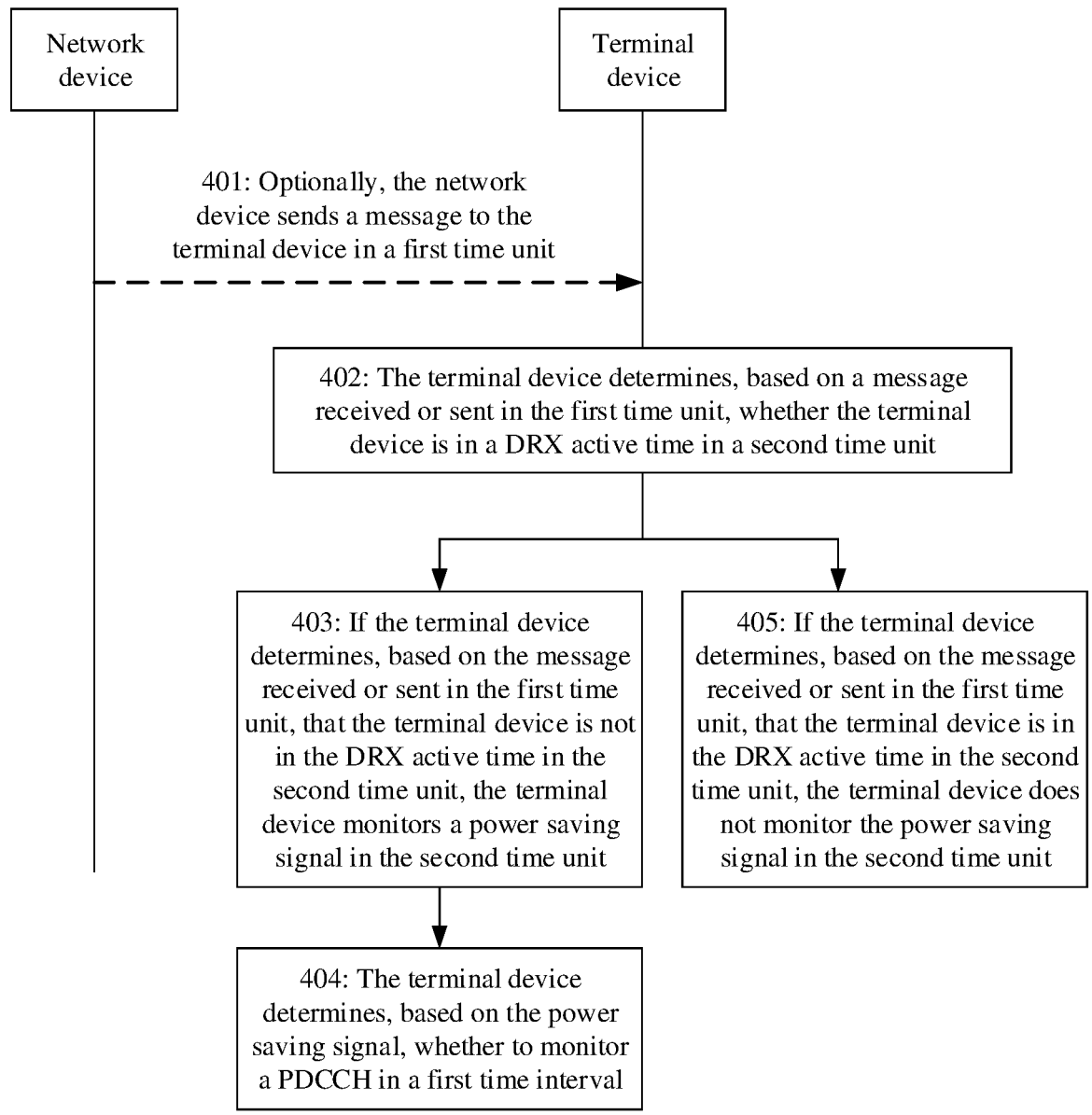
FIG. 4 is a schematic diagram of signal interaction of a method applicable to signal monitoring according to an embodiment of this application.

To make descriptions of the following embodiments clear and concise, related concepts or technologies are first briefly described.

DRX cycle: As shown in FIG. 1, a DRX cycle includes On Duration and an Opportunity for DRX. A Drx-onDuration-Timer may be started at an On Duration start moment. Expiration of the drx-onDurationTimer indicates that an "on Duration" time period ends. In running duration of the drx-onDurationTimer, when a terminal device (for example, user equipment (UE)) receives a PDCCH for scheduling an uplink (UL) or downlink (DL) new transmission, the UE may start (or restart) a drx-InactivityTimer. Duration of the drx-InactivityTimer includes duration after the UE receives the PDCCH for the new transmission. For example, the duration after the UE receives the PDCCH for the new transmission may be duration after a subframe in which the PDCCH for the new transmission is located, or duration after a PDCCH occasion in which the PDCCH is located. The PDCCH occasion is a period of time (for example, one or more symbols) used by the terminal device to monitor the PDCCH. The PDCCH occasion may also be referred to as a PDCCH monitoring occasion. The UE may continue to monitor the PDCCH in running duration of the drx-InactivityTimer until the drx-InactivityTimer expires.

In addition, for an uplink HARQ process and a downlink HARQ process, a system separately defines a time window, to allow the UE to start to monitor an uplink PDCCH or a downlink PDCCH only after a previous uplink or down link transmission lasts for the time window. The time window may be implemented through a timer. Each uplink HARQ process and each downlink HARQ process may correspond to one timer. For example, a timer corresponding to the downlink HARQ process is a HARQ RTT Timer or drx-HARQ-RTT-TimerDL, and a timer corresponding to the uplink HARQ process is a UL HARQ RTT Timer or drx-HARQ-RTT-TimerUL. RTT is short for round trip time.

For the uplink HARQ process, when the corresponding timer expires, a corresponding uplink retransmission timer (drx-RetransmissionTimerUL, also referred to as drx-UL-RetransmissionTimer) is started. For the downlink HARQ process, when the corresponding timer expires, a corresponding downlink retransmission timer (drx-RetransmissionTimerDL, also referred to as drx-RetransmissionTimer) is started. The UE may monitor the PDCCH when the drx-RetransmissionTimerUL or the drx-RetransmissionTimerDL runs.

When a DRX cycle is configured, the UE may wake up in an active time to monitor the PDCCH. If the UE is not in the active time, the UE does not need to monitor the PDCCH. In other words, the UE may enter a sleep time. Power consumption of the UE in the "sleep time" is lower than power consumption in the DRX "active time". Whether the terminal device is in the active time may be determined according to at least one of the following conditions:

(1) The active time includes at least one running time period of the following timers: the drx-onDurationTimer, the drx-InactivityTimer, the drx-RetransmissionTimerUL, the drx-RetransmissionTimerDL, or a contention resolution timer (ra-ContentionResolutionTimer or mac-ContentionResolutionTimer). The contention resolution timer may be configured to determine a time length for the terminal device to monitor, after sending a message 3 in a random access process, a PDCCH used to indicate a message 4.

(2) In a time period in which an SR is sent and is pending, the terminal device is in the active time. When an SR is triggered, the SR is pending until the SR is canceled. A time period in which the SR is pending is a time period between a moment at which the SR is sent and a moment at which the SR is canceled.

(3) In a time period in which the terminal device does not receive, after successfully receiving a random access response (RAR), a PDCCH indicating new transmission, the terminal device is in the active time. The PDCCH is scrambled through a C-RNTI, and the RAR is not an RAR of a random access preamble selected by the UE from a contention-based random access preamble.

It should be noted that, in some functions other than a DRX mechanism, it may be specified that the UE needs to be in the "active time" or "sleep time" in some cases. These function restrictions do not conflict with the DRX mechanism. Instead, a union of the function restrictions and the DRX mechanism is used. Therefore, whether the UE is actually in the "active time" or "sleep time" needs to be determined based on all functions of the UE. This is not specifically limited in this application.

In addition, in a set of DRX configurations, a base station may configure two cycles for the UE: a short DRX cycle and a long DRX cycle. Cycle lengths of the two cycles are different, and the UE may switch between the two cycles. A value range of a cycle length of the short DRX cycle is 2 ms to 640 ms, and a value range of a cycle length of the long DRX cycle is 10 ms to 10240 ms. The long DRX cycle needs to be configured by default, and the short DRX cycle is configured optionally. If the short DRX cycle is configured for the UE, the UE may start drx-ShortCycleTimer when the short DRX cycle starts. When the drx-ShortCycleTimer expires, the terminal device may implicitly switch to the long DRX cycle. A length of the drx-ShortCycleTimer is duration of the short DRX cycle.

A power saving signal, may also be referred to as a power saving signal, or may be referred to as a wake-up signal (WUS) or a PDCCH-WUS, is collectively referred to as the power saving signal in the following. The power saving signal may be carried in physical downlink control information (DCI).

The power saving signal may be used as an indication in the following manners: (1) The power saving signal is used as the wake-up signal. If the terminal device receives the power saving signal, the terminal device needs to wake up. If the terminal device does not receive the power saving signal, the terminal device may sleep by default. (2) The power saving signal explicitly indicates whether the terminal device needs to wake up or sleep subsequently. For example, the power saving signal explicitly indicates that the terminal device is in a sleep state in one or more DRX cycles (or in On Duration time periods of the one or more DRX cycles). In other words, the terminal device does not monitor the PDCCH in the one or more DRX cycles (or in the On Duration time periods of the one or more DRX cycles), to reduce power consumption of the terminal device. Alternatively, the power saving signal explicitly indicates the terminal device to monitor the PDCCH in the one or more DRX cycles, to wake up the terminal device that is in the sleep state.

The embodiments of this application may be applied to various wireless communications systems such as an LTE system, a 5G NR system, and a next-generation wireless local area network system.

FIG. 3 is a schematic diagram of a communications system applicable to a signal transmission method according to an embodiment of this application. The communications system may include a network device 100 (for example, a base station) and one or more terminal devices 200 (only one terminal device is shown in FIG. 3) connected to the network device 100. The terminal device 200 may receive, in a first time unit, a message sent by the network device 100 or send a message to the network device 100. If the terminal device 200 determines, based on the message received or sent in the first time unit, that the terminal device 200 is not in a DRX active time in a second time unit, the terminal device 200 monitors a power saving signal in the second time unit, and determine, based on the power saving signal, whether to monitor a PDCCH in a first time interval. The first time unit is located before the second time unit, and is separated from the second time unit by M third time units. M is an integer greater than or equal to 1.

The following describes the technical solutions in the embodiments of this application with reference to the accompanying drawings in the embodiments of this application. In the descriptions of this application, unless otherwise stated, "at least one" means one or more, and "a plurality of" means two or more. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

For ease of understanding, the following specifically describes, with reference to the accompanying drawings, a signal monitoring method provided in the embodiments of this application.

As shown in FIG. 4, an embodiment of this application provides a signal monitoring method, including the following steps.

401: Optionally, a network device sends a message to a terminal device and/or receives a message sent by the terminal device in a first time unit.

The message sent by the network device may include at least one of a DRX-related MAC CE, an uplink grant, or a downlink assignment. The message sent by the terminal device may be an SR.

The DRX-related MAC CE may be a DRX Command MAC CE or a Long DRX Command MAC CE. When the terminal device receives the DRX Command MAC CE or the Long DRX Command MAC CE, the terminal device needs to stop a drx-onDurationTimer and a drx-InactivityTimer. In addition, when the terminal device receives the DRX Command MAC CE, if a short DRX cycle is currently configured for the terminal device, the terminal device needs to use the short DRX cycle. If no short DRX cycle is currently configured for the terminal device, the terminal device uses a long DRX cycle. When the terminal device receives the Long DRX Command MAC CE, the terminal device needs to stop drx-ShortCycleTimer and use the long DRX cycle.

The uplink grant or the downlink assignment may be carried in DCI. If DCI indicates a physical uplink shared channel (PUSCH) for transmitting uplink data, the DCI is DCI carrying the uplink grant. If DCI indicates a physical downlink shared channel (PDSCH) for transmitting downlink data, the DCI is DCI carrying the downlink assignment.

402: The terminal device determines, based on the message received or sent in the first time unit, whether the terminal device is in a DRX active time in a second time unit.

The message received by the terminal device may include at least one of the DRX-related MAC CE, the uplink grant, or the downlink assignment. The message sent by the terminal device may be the SR.

It should be noted that the first time unit is located before the second time unit, and is separated from the second time unit by M third time units. M is an integer greater than or equal to 1. The M third time units may indicate a time interval between an end moment of the first time unit and a start moment of the second time unit, or a time interval between a start moment of the first time unit and the start moment of the second time unit, or a time interval between the end moment of the first time unit and an end moment of the second time unit. This is not limited in this application.

The first time unit may include one or more symbols (symbol), slots (slot), subframes (subframe), or radio frames. Alternatively, the first time unit may include a period of (absolute) time, for example, 1 millisecond (ms). In other words, the first time unit is in a unit of ms. Similarly, the second time unit may include one or more symbols, slots, subframes, or frames. Alternatively, the second time unit may include a period of (absolute) time, for example, 2 ms. Each of the M third time units may include one or more symbols, slots, subframes, or frames. Alternatively, the third time unit may include a period of (absolute) time, for example, 4 ms.

For example, it is assumed that the second time unit is a symbol n and the third time unit is in a unit of millisecond. In this case, the first time unit may be a period of absolute time (a period of time interval) of M milliseconds before the symbol n. M may be any integer from 1 to 7. For example, if M=4, the first time unit is located before the symbol n, and is separated from the symbol n by 4 ms. In other words, the first time unit is located 4 ms before the symbol n.

In a possible design, the second time unit may be one of N (discrete) time units (occasions), configured by the network device, that are used to monitor a power saving signal. N is an integer greater than or equal to 1. Alternatively, the second time unit is a time unit that is in a time interval (including a plurality of consecutive time units) and that is configured by the network device to monitor the power saving signal. The second time unit is usually located before OnDuration.

If the terminal device determines, based on the message received or sent in the first time unit, that the terminal device is not in the DRX active time in the second time unit, the terminal device performs step 403 and step 404. If the terminal device determines, based on the message received or sent in the first time unit, that the terminal device is in the DRX active time in the second time unit, the terminal device performs step 405.

403: If the terminal device determines, based on the message received or sent in the first time unit, that the terminal device is not in the DRX active time in the second time unit, the terminal device monitors the power saving signal in the second time unit.

In some embodiments, if a first condition is met, the terminal device is not in the DRX active time in the second time unit. The first condition includes at least one of the following:

(1) The terminal device receives the DRX-related MAC CE in the first time unit.

When receiving the DRX-related MAC CE in the first time unit, the terminal device may stop the onDurationTimer and the drx-InactivityTimer. This is because when finding that there is no data to be transmitted, a base station may send a DRX Command MAC CE to notify the terminal device to immediately enter a sleep time, to save more power. The second time unit is located after the first time unit. Therefore, it may be considered that the terminal device is also in the sleep time in the second time unit. In other words, the terminal device is not in the active time.

(2) The terminal device does not receive the uplink grant or the downlink assignment in the first time unit.

If the terminal device receives the uplink grant or the downlink assignment, because the terminal device is likely to continue to be scheduled by the base station subsequently, the terminal device may start (or restart) the drx-InactivityTimer, to send corresponding uplink data or receive corresponding downlink data. In other words, the terminal device is in the active time in the first time unit. If the terminal device does not receive the uplink grant or the downlink assignment in the first time unit, the terminal device does not need to start (or restart) the drx-InactivityTimer. It may be considered that the terminal device is not in the active time in the first time unit. The second time unit is located after the first time unit. Therefore, it may be considered that the terminal device is not in the active time in the second time unit.

(3) The terminal device does not send the SR in the first time unit.

When the terminal device needs to perform uplink transmission with the base station, the terminal device may send the SR to the base station. The SR is used to request the base station to allocate an uplink transmission resource to the terminal device. After receiving the SR sent by the terminal device, the base station may configure a specific frequency domain resource for the terminal device to send uplink data. Because the terminal device is scheduled by the base station subsequently, the terminal device needs to be in the active time and monitor a PDCCH, to send the corresponding uplink data. If the terminal device does not send the SR in the first time unit, it may be considered that the terminal device is not in the active time in the first time unit. The second time unit is located after the first time unit. Therefore, it may be considered that the terminal device is not in the active time in the second time unit.

It should be noted that the first condition may further include another case. For example, the terminal device does not initiate a random access channel (random access channel, RACH) process (for example, does not send a preamble or an MsgA) in the first time unit, or the terminal device does not receive an RAR in the first time unit. This is not specifically limited in this application.

It should be noted that, for the following plurality of cases, the terminal device determines, based on a latest case, whether the terminal device is in the active time in the second time unit: 1. The terminal device receives the DRX-related MAC CE in the first time unit. 2. The terminal device receives the uplink grant or the downlink assignment in the first time unit. 3. The terminal device sends the SR in the first time unit. 4. The terminal device initiates the RACH process in the first time unit. 5. The terminal device receives the RAR in the first time unit. Certainly, another case used to determine whether the terminal device is in the active time in the second time unit may further be included. This is not limited in this application.

For example, the terminal device receives the uplink grant or the downlink assignment at a first moment in the first time unit, and receives the DRX-related MAC CE at a second moment in the first time unit. The second moment is later than the first moment. Therefore, the terminal device determines, based on the case that the DRX-related MAC CE is received, that the terminal device is not in the DRX active time in the second time unit. For another example, the terminal device receives the DRX-related MAC CE at a third moment in the first time unit, and sends the SR at a fourth moment in the first time unit. The fourth moment is later than the third moment. Therefore, the terminal device determines, based on the case that the SR is sent, that the terminal device is in the DRX active time in the second time unit.

In this way, the terminal device may accurately determine whether the terminal device is in the DRX active time in the second time unit. This eliminates a fuzzy period of short-time alignment between a network device side and a terminal device side, so that the terminal device may accurately determine whether the power saving signal needs to be monitored in the second time unit.

If the terminal device determines that the terminal device is not in the DRX active time in the second time unit, the terminal device may monitor the power saving signal in the second time unit. For example, it is assumed that the second time unit is the symbol n, the third time unit is in the unit of ms, and a time interval between the second time unit and the first time unit is 4 ms. In this case, for the current symbol n, considering a grant/assignments/(common) DRX Command MAC CE/Long DRX Command MAC CE received by the terminal device or an SR sent by the terminal device 4 ms before the symbol n, if (a MAC entity of) the terminal device is not in the active time, the terminal device monitors the power saving signal in the second time unit (that is, in current symbol n, if the MAC entity would not be in Active Time considering grants/assignments/DRX Command MAC CE received and Scheduling Request sent until 4 ms prior to symbol n when evaluating all DRX Active Time conditions as specified in this clause, monitoring power saving signal in the specific monitoring occasion(s)).

If the terminal device detects the power saving signal in the second time unit, step 404 may be performed.

404: The terminal device determines, based on the power saving signal, whether to monitor the PDCCH in a first time interval.

The first time interval may include one or more DRX cycles (one or more On Duration time periods). The power saving signal may indicate the terminal device whether to monitor the PDCCH in one or more DRX cycles (one or more On Duration time periods) following a DRX cycle in which the second time unit is located.

For example, if the power saving signal indicates that the terminal device is in a wake-up state in a DRX cycle (or in an On Duration time period) following the DRX cycle in which the second time unit is located, the terminal device starts a duration timer (drx-onDurationTimer) corresponding to the DRX cycle following the DRX cycle in which the second time unit is located, to monitor the PDCCH in the DRX cycle (or in an On Duration time period of the DRX cycle). If the power saving signal indicates that the terminal device is in a sleep state in the DRX cycle following the DRX cycle in which the second time unit is located, the terminal device does not start the duration timer (drx-onDurationTimer) corresponding to the DRX cycle following the DRX cycle in which the second time unit is located, and the terminal device may not monitor the PDCCH, to reduce power consumption.

405: If the terminal device determines, based on the message received or sent in the first time unit, that the terminal device is in the DRX active time in the second time unit, the terminal device does not monitor the power saving signal in the second time unit.

In some embodiments, if a second condition is met, the terminal device is in the DRX active time in the second time unit. The second condition includes at least one of the following:

(1) The terminal device does not receive the DRX-related MAC CE in the first time unit.

When receiving the DRX-related MAC CE in the first time unit, the terminal device may stop the onDurationTimer and the drx-InactivityTimer. If the terminal device does not receive the DRX-related MAC CE, the onDurationTimer and/or the drx-InactivityTimer may continue to run. In other words, the terminal device is in the active time in the first time unit. The second time unit is located after the first time unit. Therefore, it may be considered that the terminal device is also in the active time in the second time unit.

(2) The terminal device receives the uplink grant or the downlink assignment in the first time unit.

If the terminal device receives the uplink grant or the downlink assignment in the first time unit, because the terminal device is likely to continue to be scheduled by the base station subsequently, the terminal device may start (or restart) the drx-InactivityTimer, to send the corresponding uplink data or receive the corresponding downlink data. In other words, the terminal device is in the active time in the first time unit. The second time unit is located after the first time unit. Therefore, it may be considered that the terminal device is in the active time in the second time unit.

(3) The terminal device sends the SR in the first time unit.

After the terminal device sends the SR to the base station, because the terminal device is scheduled by the base station subsequently, the terminal device needs to be in the active time and monitor the PDCCH, to send the corresponding uplink data. In other words, the terminal device is in the active time in the first time unit. The second time unit is after the first time unit. Therefore, it may be considered that the terminal device is also in the active time in the second time unit.

It should be noted that the second condition may further include another case. For example, the terminal device initiates the RACH process (for example, sends the preamble or the MsgA) in the first time unit, or the terminal device receives the RAR in the first time unit. This is not specifically limited in this application.

It should be noted that, for the following plurality of cases, the terminal device determines, based on a latest case, whether the terminal device is in the active time in the second time unit: 1. The terminal device receives the DRX-related MAC CE in the first time unit. 2. The terminal device receives the uplink grant or the downlink assignment in the first time unit. 3. The terminal device sends the SR in the first time unit. 4. The terminal device initiates the RACH process in the first time unit. 5. The terminal device receives the RAR in the first time unit. Certainly, another case used to determine whether the terminal device is in the active time in the second time unit may further be included. This is not limited in this application.

For example, the terminal device receives the uplink grant or the downlink assignment at the first moment in the first time unit, and receives the DRX-related MAC CE at the second moment in the first time unit. The second moment is later than the first moment. Therefore, the terminal device determines, based on the case that the DRX-related MAC CE is received, that the terminal device is not in the DRX active time in the second time unit. For another example, the terminal device receives the DRX-related MAC CE at the third moment in the first time unit, and sends the SR at the fourth moment in the first time unit. The fourth moment is later than the third moment. Therefore, the terminal device determines, based on the case that the SR is sent, that the terminal device is in the DRX active time in the second time unit.

In this way, the terminal device may accurately determine whether the terminal device is in the DRX active time in the second time unit. This eliminates the fuzzy period of the short-time alignment between the network device side and the terminal device side, so that the terminal device may accurately determine whether the power saving signal needs to be monitored in the second time unit.

If the terminal device determines that the terminal device is in the DRX active time in the second time unit, the terminal device does not need to monitor the power saving signal in the second time unit. For example, it is assumed that the second time unit is the symbol n, the third time unit is in the unit of ms, and the time interval between the second time unit and the first time unit is 4 ms. In this case, for the current symbol n, considering the grant/assignments/(common) DRX Command MAC CE/Long DRX Command MAC CE received by the terminal device or the SR sent by the terminal device 4 ms before the symbol n, if (the MAC entity of) the terminal device is in the active time, the terminal device does not monitor the power saving signal in the second time unit (that is, in current symbol n, if the MAC entity would be in Active Time considering grants/assignments/DRX Command MAC CE/Long DRX Command MAC CE received and Scheduling Request sent until 4 ms prior to symbol n when evaluating all DRX Active Time conditions as specified in this clause, not monitoring PDCCH-WUS in the specific monitoring occasion(s)).

Further, the terminal device may start the duration timer (drx-onDurationTimer) corresponding to the DRX cycle following the DRX cycle in which the second time unit is located, so that the terminal device is in the wake-up state in a next onDuration. In other words, the terminal device monitors the PDCCH.

It should be noted that step 401 to step 405 are not subject to an execution sequence, and not all the steps need to be executed. The execution sequence between the steps and an execution necessity are not specifically limited in this embodiment.

In this embodiment of this application, the terminal device may determine, based on the message received or sent in the first time unit, whether the terminal device is in the DRX active time in the second time unit. If it is determined that the terminal device is not in the DRX active time in the second time unit, the terminal device monitors the power saving signal in the second time unit. If it is determined that the terminal device is in the DRX active time in the second time unit, the terminal device does not monitor the power saving signal in the second time unit. In other words, the terminal device may determine, based on the message received or sent in the first time unit, whether the terminal device is in the active time in the second time unit (an occasion for monitoring the power saving signal), to determine whether the terminal device needs to monitor the power saving signal on a corresponding occasion. This resolves a problem existing in the prior art.

The foregoing mainly describes the solutions provided in the embodiments of this application from perspectives of the terminal device and the network device. It may be understood that to implement the foregoing functions, the terminal device and the network device include corresponding hardware structures and/or software modules for performing the functions. A person skilled in the art should easily be aware that, in combination with the algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement a described function for each particular application, but it should not be considered that the implementation goes beyond the scope of this application.

In the embodiments of this application, functional modules of the terminal device and the network device may be divided based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. There may be another division manner in an actual implementation.

Figure 5:
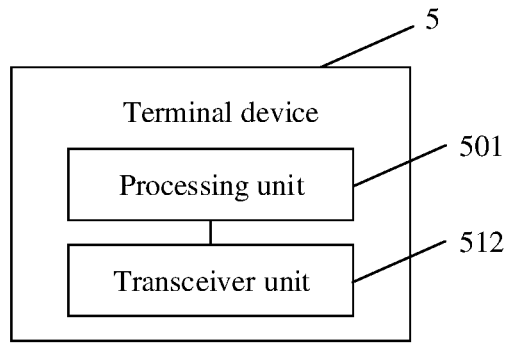
FIG. 5 is a schematic diagram of a structure of a terminal device according to an embodiment of this application.

When each functional module is obtained through division based on each corresponding function, a possible schematic diagram of a structure of a terminal device 5 in the foregoing embodiments is shown in FIG. 5. The terminal device 5 includes a processing unit 501 and a transceiver unit 502. In this embodiment of this application, the processing unit 501 is configured to: if it is determined, based on a message received or sent by the transceiver unit 502 in a first time unit, that the terminal device is not in a DRX active time in a second time unit, monitor a power saving signal in the second time unit. The processing unit 501 is further configured to determine, based on the power saving signal, whether to monitor a PDCCH in a first time interval. The first time unit is located before the second time unit, and is separated from the second time unit by M third time units. M is an integer greater than or equal to 1.

In the method embodiment shown in FIG. 4, the processing unit 501 is configured to support the terminal device in performing the processes 403 to 405 in FIG. 4. The transceiver unit 502 is configured to support the terminal device in performing the process 402 in FIG. 4.

Figure 6:
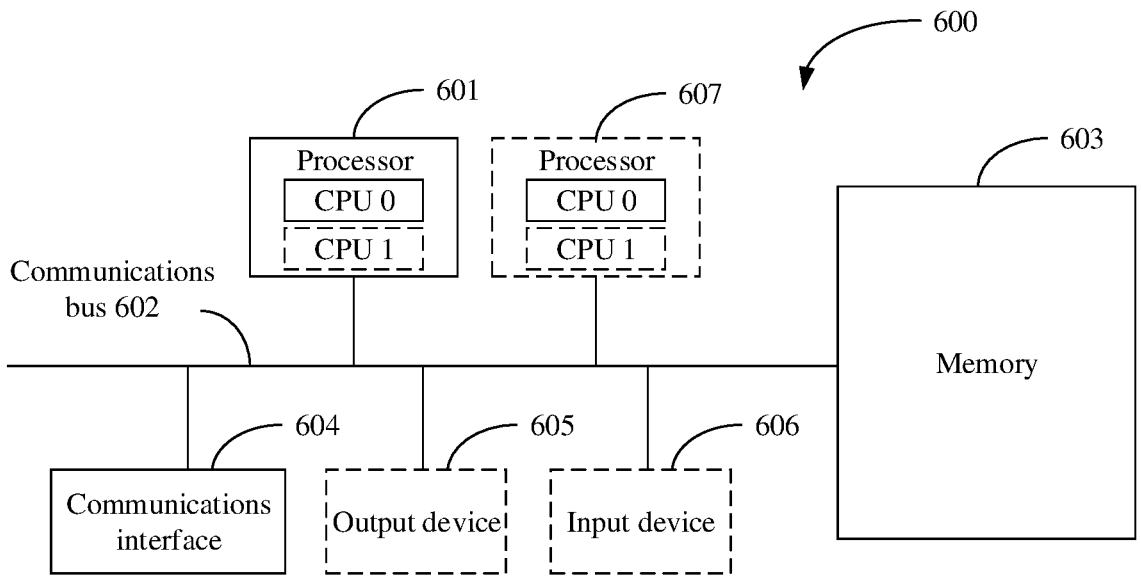
FIG. 6 is a schematic diagram of a structure of another terminal device according to an embodiment of this application.

In a possible design, the terminal device may be implemented through a structure (an apparatus or a system) in FIG. 6.

FIG. 6 is a schematic diagram of a structure according to an embodiment of this application. The structure 600 includes at least one processor 601, a communications bus 602, a memory 603, and at least one communications interface 604.

The processor 601 may be a CPU, a microprocessing unit, an ASIC, or one or more integrated circuits configured to control program execution in the solutions of this application.

The communications bus 602 may include a path for transferring information between the foregoing components.

The communications interface 604 uses any transceiver-type apparatus, to communicate with another device or a communications network such as the Ethernet, a radio access network (RAN), or a wireless local area network (WLAN).

The memory 603 may be a read-only memory (ROM) or another type of static storage device capable of storing static information and instructions, or a random access memory (RAM) or another type of dynamic storage device capable of storing information and instructions, or may be an electrically erasable programmable read-only memory EEPROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. The memory may alternatively be integrated with the processor.

The memory 603 is configured to store application program code for executing the solutions in this application, and the processor 601 controls the execution. The processor 601 is configured to execute the application program code stored in the memory 603, to implement a function in the method in this application.

In a specific implementation, in an embodiment, the processor 601 may include one or more CPUs, for example, a CPU 0 and a CPU 1 in FIG. 6.

In a specific implementation, in an embodiment, the structure 600 may include a plurality of processors, for example, the processor 601 and a processor 607 in FIG. 6. Each of the processors may be a single-core (single-CPU) processor or a multi-core (multi-CPU) processor. The processor herein may refer to one or more devices, circuits, and/or processing cores configured to process data (for example, a computer program instruction).

In a specific implementation, in an embodiment, the structure 600 may further include an output device 605 and an input device 606. The output device 605 communicates with the processor 601, and may display information in a plurality of manners. For example, the output device 605 may be a liquid crystal display (LCD), a light emitting diode (LED) display device, a cathode ray tube (CRT) display device, or a projector. The input device 606 communicates with the processor 601, and may receive an input of a user in a plurality of manners. For example, the input device 606 may be a mouse, a keyboard, a touchscreen device, a sensing device, or the like.

In a specific implementation, the structure 600 may be a desktop computer, a portable computer, a network server, a personal digital assistant (PDA), a mobile phone, a tablet computer, a wireless terminal device, a communications device, an embedded device, or a device with a structure similar to that in FIG. 6. A type of the structure 600 is not limited in this embodiment of this application.

Figure 7:
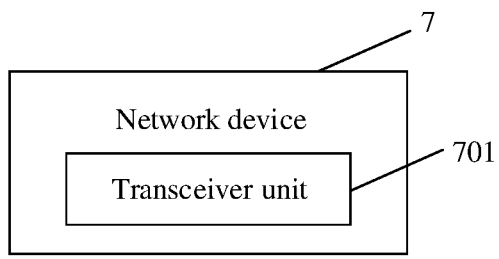
FIG. 7 is a schematic diagram of a structure of a network device according to an embodiment of this application.

When each functional module is obtained through division based on each corresponding function, a possible schematic diagram of a structure of a network device 7 in the foregoing embodiments is shown in FIG. 7. The network device 7 includes a transceiver unit 701. In this embodiment of this application, the transceiver unit 701 is configured to send or receive a message in a first time unit. A sent message includes at least one of a DRX-related MAC CE, an uplink grant, or a downlink assignment. A received message includes an SR.

In the method embodiment shown in FIG. 4, the transceiver unit 701 is configured to support the network device in performing the process 401 in FIG. 4.

Figure 8:
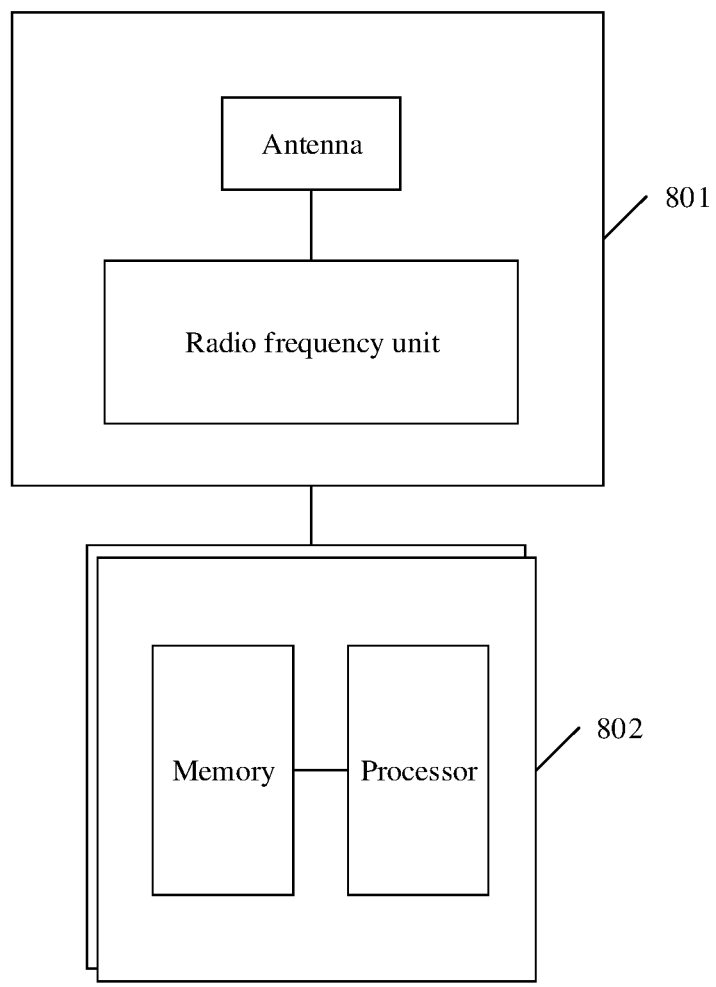
FIG. 8 is a schematic diagram of a structure of another network device according to an embodiment of this application.

In a possible design, the network device may be implemented through a base station in FIG. 8.

FIG. 8 is a schematic diagram of a structure of a base station according to an embodiment of this application. The base station includes a part 801 and a part 802. The part 801 of the base station is mainly configured to receive/send a radio frequency signal, and perform conversion between a radio frequency signal and a baseband signal. The part 802 of the base station is mainly configured to perform baseband processing, control the base station, and the like. The part 801 may be usually referred to as a transceiver unit, a transceiver machine, a transceiver circuit, a transceiver, or the like. The part 802 is usually a control center of the base station, and may be usually referred to as a processing unit, configured to control the base station to perform the steps performed by the base station (namely, the network device) in FIG. 4. For details, refer to descriptions in the foregoing related pails.

The transceiver unit in the part 801 may also be referred to as a transceiver machine, a transceiver, or the like. The transceiver unit includes an antenna and a radio frequency unit. The radio frequency unit is mainly configured to perform radio frequency processing. Optionally, a component, in the part 801, that is configured to implement a receiving function may be considered as a receiving unit, and a component that is configured to implement a sending function may be considered as a sending unit. In other words, the part 801 includes the receiving unit and the sending unit. The receiving unit may also be referred to as a receiver machine, a receiver, a receiver circuit, or the like, and the sending unit may be referred to as a transmitter machine, a transmitter, a transmitter circuit, or the like.

The part 802 may include one or more boards. Each board may include one or more processors and one or more memories. The processor is configured to read and execute a program in the memory, to implement a baseband processing function and control the base station. If there is a plurality of boards, the boards may be interconnected to improve a processing capability. In an optional implementation, a plurality of boards may share one or more processors, or a plurality of boards share one or more memories, or a plurality of boards simultaneously share one or more processors. The memory and the processor may be integrated together, or may be independently disposed. In some embodiments, the part 801 and the part 802 may be integrated together, or may be independently disposed. In addition, all functions of the part 802 may be integrated into one chip for implementation. Alternatively, some functions may be integrated into one chip for implementation and some other functions are integrated into one or more other chips for implementation. This is not limited in this application.

A person skilled in the art should be aware that in the foregoing one or more examples, functions described in this application may be implemented by hardware, software, firmware, or any combination thereof. When the present invention is implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific implementations of this application, but are not intended to limit the protection scope of this application. Any modification, equivalent replacement or improvement made based on technical solutions of this application shall fall within the protection scope of this application.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method comprising:
   determining, by a terminal device based on a message received in a first time unit or a message sent in the first time unit, that the terminal device is in a discontinuous reception (DRX) active time in a second time unit, wherein the first time unit is located before the second time unit, and is separated from the second time unit by M third time units, and M is an integer greater than or equal to 1; and
   in response to the determination that the terminal device is in the DRX active time in the second time unit, skipping monitoring, by the terminal device, of a power saving signal in the second time unit, wherein the power saving signal indicates the terminal device whether to monitor a physical downlink control channel (PDCCH) in a first time interval.

2. The method according to claim 1, wherein the method further comprises:
   starting, by the terminal device, a duration timer corresponding to a next DRX cycle following a DRX cycle in which the second time unit is located.

3. The method according to claim 1, wherein the message received by the terminal device in the first time unit comprises at least one of a DRX command media access control control element (MAC CE), a long DRX command media access control control element (MAC CE), an uplink grant, or a downlink assignment; or
   the message sent by the terminal device in the first time unit comprises a scheduling request (SR).

4. The method according to 1, wherein a third time unit of the M third time units is in a unit of milliseconds, and M is 4.

5. The method according to claim 1, wherein the first time interval comprises duration of one DRX cycle.

6. The method according to claim 1, wherein the first time interval comprises duration of a plurality of DRX cycles.

7. The method according to claim 1, wherein
   the first time unit comprises one or more symbols, slots, subframes, or radio frames; and
   the second time unit comprises one or more symbols, slots, subframes, or frames.

8. The method according to claim 1, wherein
   the first time unit comprises t milliseconds, and t is an integer greater than 0; and
   the second time unit comprises q milliseconds, and q is an integer greater than 0.

9. The method according to claim 1,
   wherein determining, by the terminal device, that the terminal device is in the DRX active time in the second time unit comprises determining that a second condition is met, wherein the second condition comprises:
   the terminal device does not receive a DRX-related DRX command media access control control element (MAC CE) in the first time unit,
   the terminal device receives an uplink grant or a downlink assignment in the first time unit; or
   the terminal device sends the SR in the first time unit.

10. The method according to claim 1, wherein
    the second time unit is one of N time units that are configured by a network device to monitor the power saving signal, and N is an integer greater than or equal to 1; or
    the second time unit is a time unit that is in a time interval and that is configured by the network device to monitor the power saving signal.

11. A communications apparatus, comprising a processor, wherein the processor is coupled to a non-transitory memory, the non-transitory memory stores an instruction, and when the processor invokes and executes the instruction, the communications apparatus is caused to perform the method according to claim 1.

12. A non-transitory computer-readable storage medium, comprising an instruction, wherein when the instruction is run on a computer, the computer is caused to perform the method according to claim 1.

13. A chip system, comprising a non-transitory memory, wherein the non-transitory memory stores a computer-executable instruction, and when the computer-executable instruction is run on a computer, the computer performs the method according to claim 1.

14. A communication apparatus comprising:
    one or more memories storing instructions; and
    one or more processors that, when executing the instructions stored on the one or more memories, are configured to:
    determine, based on a message received in a first time unit or a message sent by a transceiver unit in the first time unit, that a terminal device is in a discontinuous reception (DRX) active time in a second time unit, wherein the first time unit is located before the second time unit, and is separated from the second time unit by M third time units, and M is an integer greater than or equal to 1, and
    in response to the determination that the terminal device is in the DRX active time in the second time unit, skip monitoring of a power saving signal in the second time unit, wherein the power saving signal indicates the terminal device whether to monitor a physical downlink control channel (PDCCH) in a first time interval.

15. The communication apparatus according to claim 14, wherein the one or more processors that, when executing the instructions stored on the one or more memories, are further configured to start a duration timer corresponding to a next DRX cycle following a DRX cycle in which the second time unit is located.

16. The communication apparatus according to claim 14, wherein the message received in the first time unit comprises at least one of a DRX command media access control control element (MAC CE), a long DRX command media access control control element (MAC CE), an uplink grant, or a downlink assignment; or the message sent by the terminal device in the first time unit comprises a scheduling request (SR).

17. The communication apparatus according to claim 14, wherein a third time unit of the M third time units is in a unit of milliseconds, and M is 4.

* * * * *